US012643533B2

(12) United States Patent
Kim

(10) Patent No.: US 12,643,533 B2
(45) Date of Patent: Jun. 2, 2026

(54) APPARATUS FOR ASSISTING PARKING FOR HOST VEHICLE AND METHOD THEREOF

(71) Applicant: HL Klemove Corp., Incheon (KR)

(72) Inventor: Donghyeon Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 231 days.

(21) Appl. No.: 18/207,275

(22) Filed: Jun. 8, 2023

(65) Prior Publication Data

US 2024/0051520 A1      Feb. 15, 2024

(30) Foreign Application Priority Data

Aug. 9, 2022     (KR) ......................... 10-2022-0098961

(51) Int. Cl.
  *B60W 30/06*      (2006.01)
  *G01S 13/89*      (2006.01)
  *G06V 10/764*     (2022.01)
  *G06V 20/58*      (2022.01)

(52) U.S. Cl.
  CPC ............. *B60W 30/06* (2013.01); *G01S 13/89* (2013.01); *G06V 10/764* (2022.01); *G06V 20/586* (2022.01); *B60W 2420/408* (2024.01)

(58) Field of Classification Search
  CPC ........... B62D 15/0285; B62D 15/0275; B60W 30/06; G06K 9/00812; B60R 2300/806; B60T 2201/10
  See application file for complete search history.

(56) References Cited

U.S. PATENT DOCUMENTS

| | | | |
|---|---|---|---|
| 2016/0063861 A1* | 3/2016 | Lee ........................... | G08G 1/14 |
| | | | 340/932.2 |
| 2016/0280263 A1* | 9/2016 | Mori .................... | B62D 15/027 |
| 2018/0345955 A1* | 12/2018 | Kim ................... | B62D 15/0285 |

FOREIGN PATENT DOCUMENTS

| | | |
|---|---|---|
| CN | 114706070 A | 7/2022 |
| KR | 10-2018-0078981 A | 7/2018 |

OTHER PUBLICATIONS

Korean Office Action issued on Apr. 25, 2024, in connection with the Korean Patent Application No. 10-2022-0098961 with its English translation, 7 pages.

* cited by examiner

*Primary Examiner* — Kenneth J Malkowski
(74) *Attorney, Agent, or Firm* — Hauptman Ham, LLP

(57) ABSTRACT

The present disclosure provides an apparatus for classifying a parking space to perform autonomous parking of a vehicle, which includes a 4D imaging radar for detecting the length, height, depth and speed of an object that is located in a parking lot to output as a point cloud, and a processor for processing the point cloud to extract a plurality of corner points of the object and classifying parking spaces that are available in a parking lot based on the plurality of corner points.

9 Claims, 6 Drawing Sheets

APPARATUS FOR ASSISTING PARKING FOR HOST VEHICLE AND METHOD THEREOF

CROSS-REFERENCE TO RELATED APPLICATION

This application claims priority to and the benefit of Korean Patent Application No. 10-2022-0098961, filed on Aug. 9, 2022, the disclosure of which is incorporated herein by reference in its entirety.

BACKGROUND

1. Field of the Invention

The present disclosure relates to an apparatus for assisting parking for a host vehicle and a method thereof, and more specifically to a system and method for classifying a parking space by using a 4D imaging radar to perform the autonomous parking of a vehicle.

2. Discussion of Related Art

In general, an autonomous or semi-autonomous vehicle includes a function of checking a parking space and performing autonomous parking. It includes technical configurations of obtaining information on available parking spaces while passing between normal parking spaces, and additionally controlling the steering, driving, braking and shifting as necessary according to information on the size of the parking space and obstacles.

In order to resolve the difficulty of parking due to the narrowness of parking spaces and the driver's inexperience in driving, such an autonomous parking control system is a system that sets a movement trajectory for parking a vehicle that is stopped around the parking space and controls the movement of the vehicle according to the set element trajectory to enable the parking of vehicle without driver manipulation.

When the driver activates an autonomous parking system for use, the autonomous parking system recognizes a parking space that is in front of the driving direction or has already passed to the driver, or recognizes the space of the parking space and performs parking during autonomous driving.

Meanwhile, when the autonomous parking system erroneously detects a pedestrian, a parked vehicle or a curb as a vehicle target, it may erroneously detect a parking space. As such, in order to prevent malfunction of the autonomous parking system, it is necessary to accurately detect a vehicle target and classify a parking space.

Conventional autonomous parking systems use ultrasonic sensors and 2D radars to detect vehicle targets. However, since the ultrasonic sensor cannot accurately detect the vehicle target and the 2D radar outputs only distance and angle information to the vehicle target, it is impossible to accurately estimate the size of the vehicle target.

SUMMARY OF THE INVENTION

An object of the present disclosure is to provide an apparatus for classifying a parking space which is capable of accurately detecting and classifying a parking space in a parking lot by using a 4D imaging radar.

The technical problems to be achieved in the present disclosure are not limited to the above-mentioned technical problems, and other technical problems that are not mentioned can be clearly understood by those skilled in the art from the description below.

In order to achieve the above-described object, the present disclosure provides an apparatus for assisting parking for a host vehicle, including a radar for detecting the length, height, depth and speed of an object located in a parking lot and outputting as a point cloud; and a processor which is communicatively connected to the radar, wherein the processor is configured to signal-process the point cloud to extract a plurality of corner points of the object, and classify parking spaces that are available in the parking lot based on the plurality of corner points.

Herein, the processor determines whether the object is a vehicle target by calculating the length, height and depth of the object based on distances between the plurality of corner points.

In addition, the processor determines whether the object is a vehicle target that is parked in the parking lot based on the speed of the object.

In addition, the processor determines whether the object is a vehicle target based on the signal strength of electromagnetic waves that are emitted from the radar, reflected from the object and returned.

In addition, the processor determines whether the object is a vehicle target that is parked in the parking lot, and the number of vehicle targets based on the plurality of corner points.

In addition, the processor calculates the length and depth of the vehicle target and the length and depth of the parking space based on the plurality of corner points.

In addition, the processor calculates an angle of the vehicle target with respect to the scan direction of the radar.

In addition, the processor determines the parking space as a parallel parking space, if the vehicle target is parallel to the scan direction of the radar, the length of the target vehicle is included in a vehicle full-length range, and the length of the parking space is greater than or equal to a maximum value of the vehicle full-length range.

In addition, the processor determines the parking space as a perpendicular parking space, if the vehicle target is parallel to the scan direction of the radar, the length of the target vehicle is included in a vehicle full-width range, and the length of the parking space is greater than or equal to a maximum value of the vehicle full-width range.

In addition, the processor determines the parking space as an oblique parking space, if the angle of the vehicle target is greater than or equal to a reference angle, the length of the target vehicle is included in a vehicle full-width range, and the length of the parking space is greater than or equal to a maximum value of the vehicle full-width range.

In addition, the present disclosure provides a method for assisting parking for a host vehicle, including the steps of: detecting the distance, height, depth and speed of an object located in a parking lot by a radar and outputting as a point cloud; extracting, by a processor, a plurality of corner points of the object by signal processing the point cloud; and classifying, by a processor, parking spaces that are available in the parking lot based on the plurality of corner points.

Herein, the step of classifying parking spaces includes the steps of calculating the length, height and depth of the object based on distances between the plurality of corner points; and determining the object as a vehicle target if the length, height and depth of the object are included in a reference range.

In addition, the step of classifying parking spaces includes the step of determining the object as a vehicle target that is parked in the parking lot, if the speed of the object is less than a reference speed.

In addition, the step of classifying parking spaces includes the step of determining the object as a vehicle target, if the signal strength of electromagnetic waves that are emitted from a 4D imaging radar, reflected from the object and returned is greater than equal to a reference signal strength.

In addition, the step of classifying parking spaces includes the step of determining whether the object is a vehicle target and the number of vehicle targets based on the plurality of corner points.

In addition, the step of classifying parking spaces further includes the steps of: calculating the length and depth of the vehicle target and the length and depth of the parking space based on the plurality of corner points; and calculating an angle of the vehicle target with respect to the scanning direction of the 4D imaging radar.

In addition, the step of classifying parking spaces further includes the step of determining the parking space as a parallel parking space, if the vehicle target is parallel to the scan direction of the radar, the length of the target vehicle is included in a vehicle full-length range, and the length of the parking space is greater than or equal to a maximum value of the vehicle full-length range.

In addition, the step of classifying parking spaces further includes the step of determining the parking space as a perpendicular parking space, if the vehicle target is parallel to the scan direction of the radar, the length of the target vehicle is included in a vehicle full-width range, and the length of the parking space is greater than or equal to a maximum value of the vehicle full-width range.

In addition, the step of classifying parking spaces further includes the step of determining the parking space as an oblique parking space, if the angle of the vehicle target is greater than or equal to a reference angle, the length of the target vehicle is included in a vehicle full-width range, and the length of the parking space is greater than or equal to a maximum value of the vehicle full-width range.

According to the present disclosure, it is possible to minimize malfunction of the autonomous parking system and improve reliability by accurately detecting and classifying a parking space in a parking lot by using a 4D imaging radar.

The effects of the present disclosure are not limited to those mentioned above, and other effects that are not mentioned will be clearly understood by those skilled in the art from the description below.

DETAILED DESCRIPTION OF THE EMBODIMENTS

Figure 1:
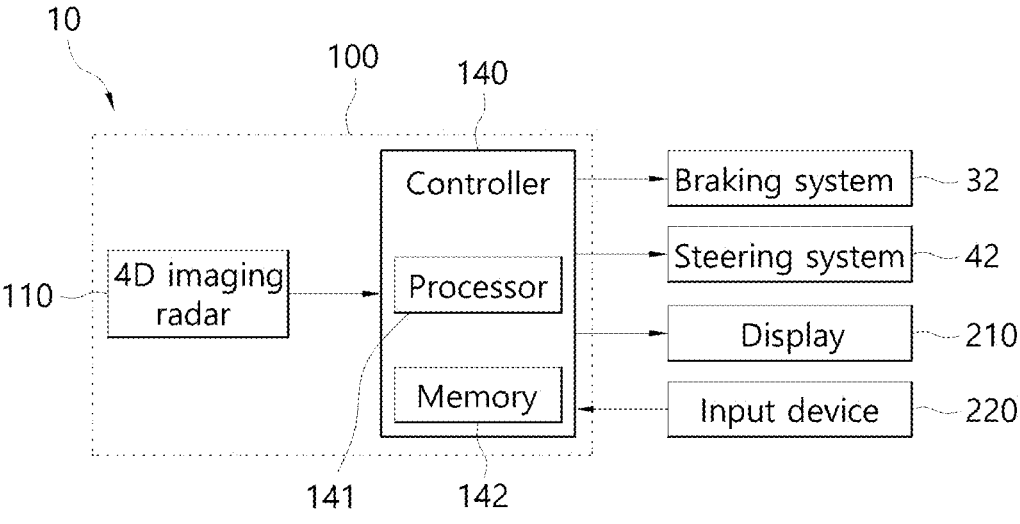
FIG. 1 is a block diagram of the autonomous parking system according to an exemplary embodiment of the present disclosure.

Hereinafter, with reference to the accompanying drawings, the exemplary embodiments of the present disclosure will be described in detail so that those skilled in the art can easily practice the present disclosure. The present disclosure may be embodied in many different forms and is not limited to the exemplary embodiments set forth herein. In order to clearly describe the present disclosure in the drawings, parts that are irrelevant to the description are omitted, and the same reference numerals are assigned to the same or similar components throughout the specification.

In the present specification, terms such as "include" or "have" are intended to designate that there exists a feature, number, step, operation, component, part or combination thereof as described in the specification, but it should be understood that it does not preclude the possibility of the presence or addition of one or more other features or numbers, steps, operations, components, parts or combinations thereof.

Figure 2:
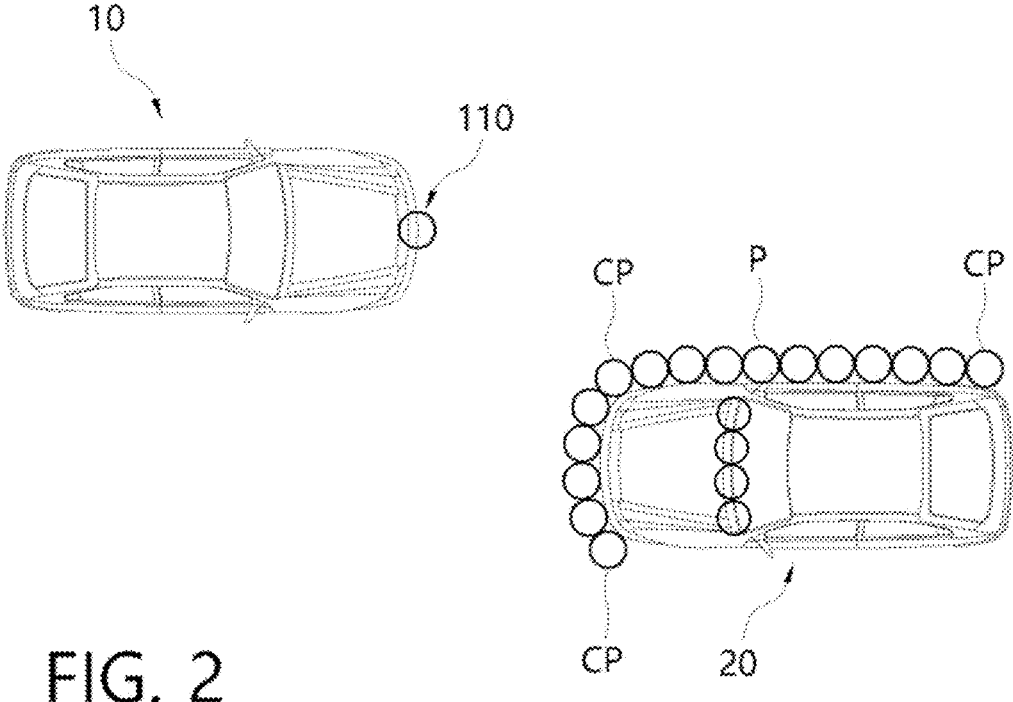
FIG. 2 is a diagram for describing the method for detecting an object by using a 4D imaging radar according to an exemplary embodiment of the present disclosure.

FIG. 1 is a block diagram of the autonomous parking system according to an exemplary embodiment of the present disclosure, and FIG. 2 is a diagram for describing the method for detecting an object by using a 4D imaging radar according to an exemplary embodiment of the present disclosure.

As illustrated in FIG. 1, the host vehicle 10 may be configured by including a braking system 32, a steering system 42, an apparatus for assisting parking 100, a display 210 and an input device 220.

In addition, the apparatus for assisting parking 100 according to an exemplary embodiment of the present disclosure may be configured as a part of an autonomous runner system, and it may include a 4D imaging radar 110 and a controller 140.

The apparatus for assisting parking 100 is an apparatus that classifies a parking space in order to perform the autonomous parking of a host vehicle 1. Herein, the parking space is a space that can be parked in a parking lot, and it can be classified into a parallel parking space, a perpendicular parking space and an oblique parking space.

The input device 220 generates data according to the driver's manipulation. For example, the input device 220 generates data for turning on or off an autonomous parking service (automatic valet parking service) function according to a driver's input.

The input device 220 may be implemented as a keyboard, a keypad, a button, a switch, a touch pad, a touch screen and the like.

The braking system 32 and the steering system 42 perform the autonomous parking of a vehicle according to instructions from the controller 140.

The braking system 32 is a system for controlling the speed of the vehicle, and it may be implemented as an electronic stability control (ESC).

The braking system 32 may control the braking pressure according to the position of a brake pedal or control the braking pressure according to the control of a vehicle controller 150.

The steering system 42 is a system for controlling the steering of a vehicle, and it may be implemented as motor drive power steering (MDPS).

The steering system 42 may control the steering angle of a vehicle according to the control of the controller 140.

Although not illustrated in the drawing, the vehicle 10 may further include a driving system and a transmission system.

The drive system is a system for controlling the engine of a host vehicle and controls the acceleration of a host vehicle. Herein, the driving system may be implemented as an engine management system (EMS).

The driving system controls the driving torque of an engine according to accelerator pedal position information that is output from an accelerator pedal position sensor. Such a driving system may control engine output to follow the driving speed of the host vehicle as requested by the controller 140 during autonomous parking.

The shift system is a system for controlling the shifting of the host vehicle and may be implemented as a shift by wire (SBW). Herein, the shift system controls the shifting of the vehicle according to the gear position and gear state range.

The display 210 may output processing states and results according to the operation of the controller 140. Herein, the display 210 may include a sound output module such as a speaker which is capable of outputting audio data. For example, the display 210 may display a parking space search result and output a voice signal (audio signal) through a speaker.

In addition, the display 210 is implemented as a touch screen combined with a touch sensor and may be used as an input device as well as an output device. Herein, as the touch sensor, a touch film or a touch pad may be used.

The display 210 may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen and a cluster.

The 4D imaging radar 110 may recognize objects more accurately than conventional radar by deep learning a point cloud-based spatial image in 4 dimensions (distance, speed, angle and height).

Referring to FIG. 2, the 4D imaging radar 110 is used to search for a parking space when the vehicle is moving, and it may be installed at the front, rear and side of the vehicle, respectively.

The 4D imaging radar 110 may detect the length, height, depth and speed of objects located in a parking lot (e.g., a parked vehicle 20, a pedestrian and a curb) to output a point cloud consisting of a plurality of points P.

The 4D imaging radar 110 may scan the surroundings by radiating electromagnetic waves, and receive electromagnetic waves that are reflected from an object to check the distance and angle of the object and the height and speed of the object.

The controller 140 includes a processor 141 and a memory 142, and it may classify parking spaces. In addition, the controller 140 may classify parking spaces and then create a parking path according to the classified parking spaces.

The memory 142 may store software that is programmed such that the processor 141 performs a predetermined operation, and it may store input/output data. The memory 142 may store an available parking space recognition algorithm, a parking path generation algorithm and a parking control algorithm. In addition, the memory 142 may store information such as the width (breadth), length, height and weight of the host vehicle.

The memory 142 may be implemented as at least one storage medium among storage media such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage and the like.

The processor 141 controls the overall operation of the autonomous parking system. Herein, the processor 141 may include at least one of an application specific integrated circuit (ASIC), a digital signal processor (DSP), programmable logic devices (PLD), field programmable gate arrays (FPGA), a central processing unit (CPU), microcontrollers and microprocessors.

The processor 141 activates the autonomous parking service when receiving an autonomous parking service operating command from the input device 220 while the vehicle is stopped. For example, the processor 141 may start the autonomous parking service when a remote smart parking assist (RSPA) button provided in the host vehicle or an RSPA button provided on a smart key is input.

Figure 3:
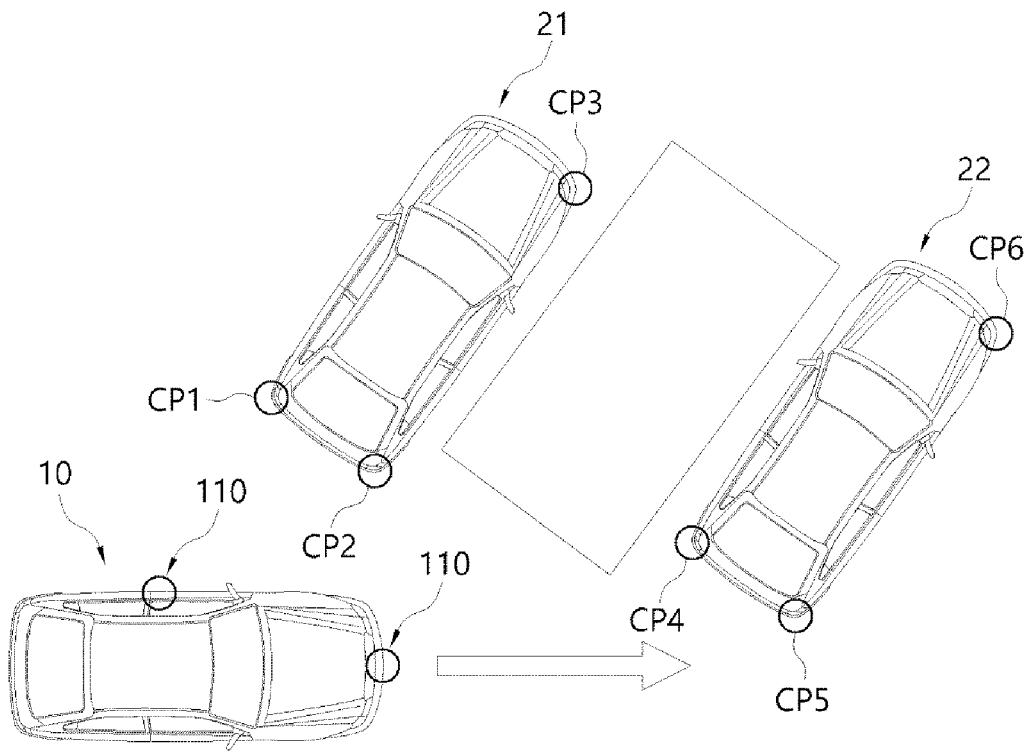
FIG. 3 is a diagram for describing the method for searching for a parallel parking space by using an apparatus for assisting parking according to an exemplary embodiment of the present disclosure.
Figure 4:
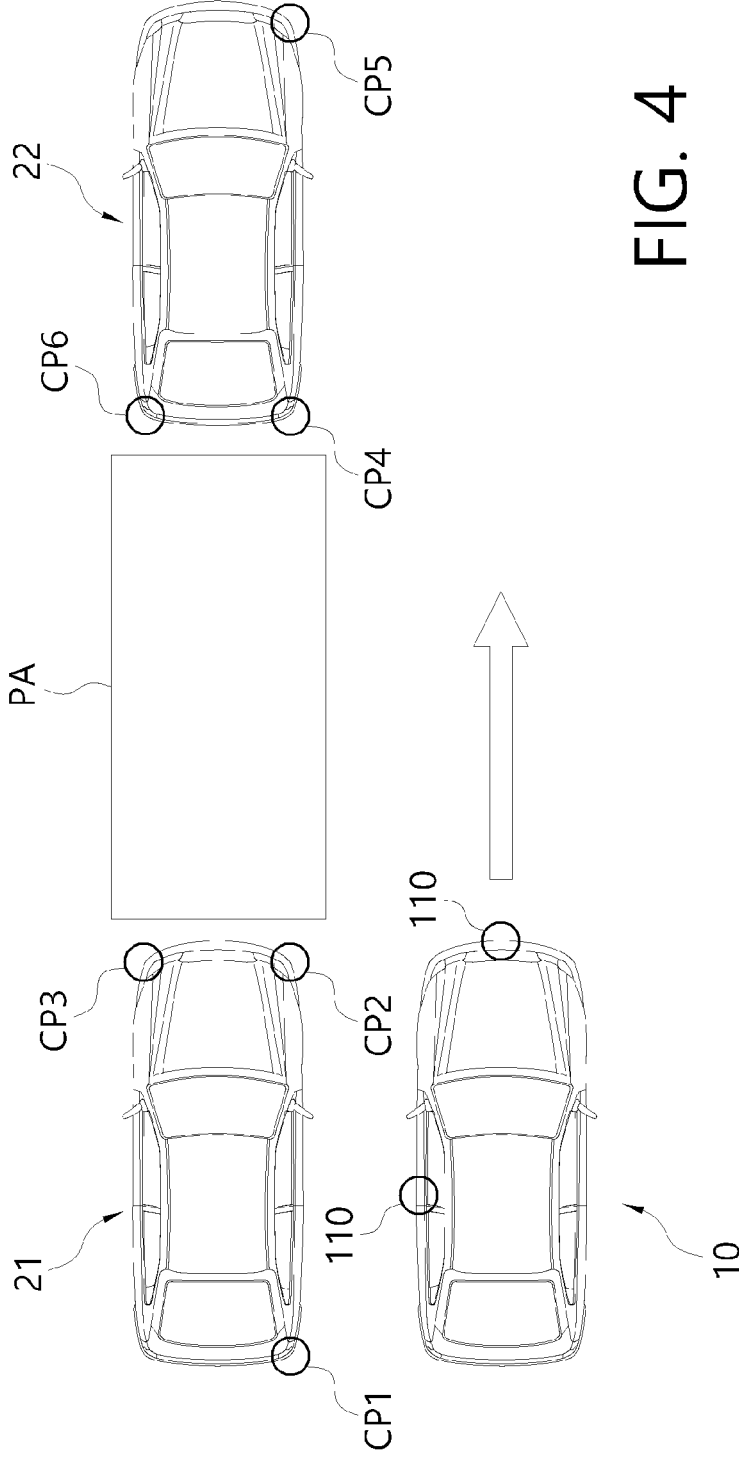
FIG. 4 is a diagram for describing the method for searching for a perpendicular parking space by using an apparatus for assisting parking according to an exemplary embodiment of the present disclosure.
Figure 5:
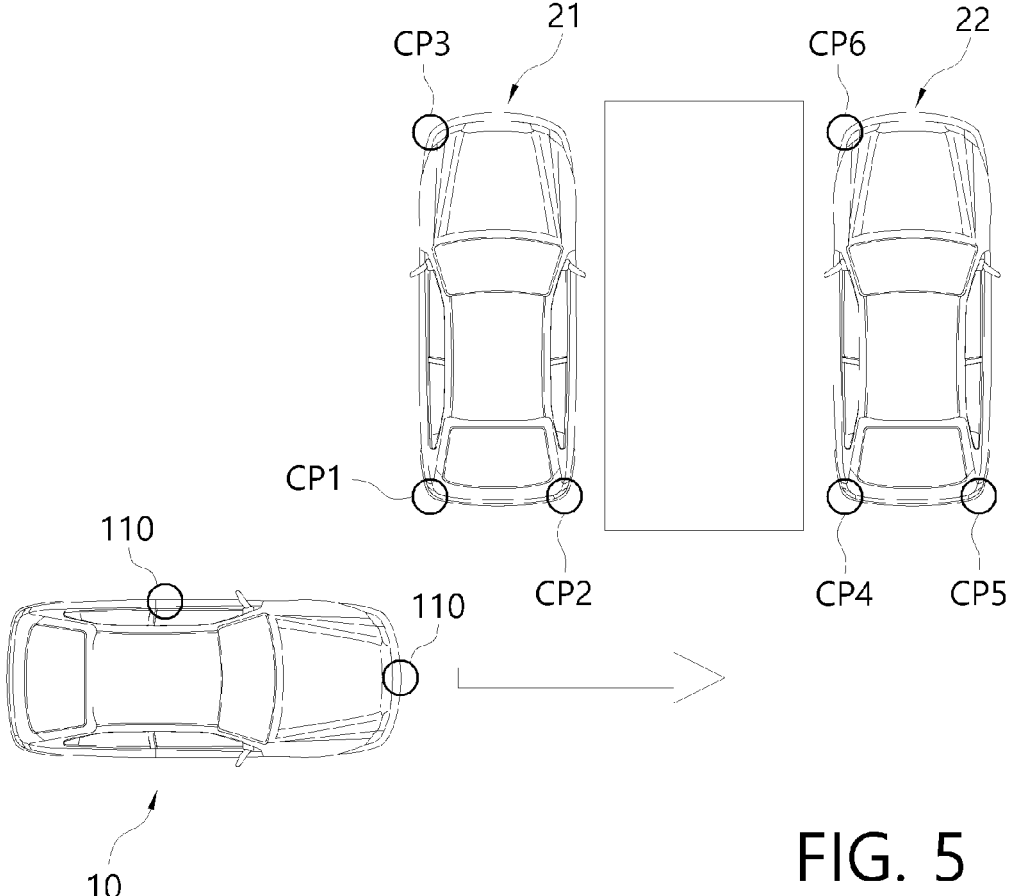
FIG. 5 is a diagram for describing the method for searching for an oblique parking space by using an apparatus for assisting parking according to an exemplary embodiment of the present disclosure.

FIG. 3 is a diagram for describing the method for searching for a parallel parking space by using an apparatus for assisting parking according to an exemplary embodiment of the present disclosure, FIG. 4 is a diagram for describing the method for searching for a perpendicular parking space by using an apparatus for assisting parking according to an exemplary embodiment of the present disclosure, and FIG. 5 is a diagram for describing the method for searching for an oblique parking space by using an apparatus for assisting parking according to an exemplary embodiment of the present disclosure.

Hereinafter, the apparatus for assisting parking according to an exemplary embodiment of the present disclosure will be described in detail with reference to FIGS. 3 to 5.

When the autonomous parking service is activated, the 4D imaging radar 110 detects the length, height, depth and speed of objects located in the parking lot (e.g., parked vehicles 21, 22, pedestrians and curbs) to output a point cloud consisting of a plurality of points P.

The processor 141 may signal-process a point cloud which is output by the 4D imaging radar 110 to extract a plurality of corner points CP1 to CP6 of the object, and classify a parking space that is available in the parking lot based on the plurality of corner points.

Specifically, the processor 141 may calculate the length, height and depth of the objects 21, 22 based on the distances between the plurality of corner points CP1 to CP6 so as to determine whether the objects 21, 22 are vehicle targets 21, 22 that are parked in a parking lot.

In addition, the processor 141 may determine whether the objects 21, 22 are vehicle targets 21, 22 that are parked in the parking lot and the number of vehicle targets 21, 22 based on the plurality of corner points CP1 to CP6.

In addition, the processor 141 may calculate the length and depth of the vehicle targets 21, 22 and the length and depth of the parking space PA based on the plurality of corner points CP1 to CP6.

For example, referring to FIG. 3, the processor 141 may determine that a first object 21 is a first vehicle target 21 by calculating a first length between the first corner point CP1 and the second corner point CP2 of a first object 21 to determine that the first length is included in a vehicle full-length range, and by calculating a first depth between the second corner point CP2 and the third corner point CP2 of a first object 21 to determine that the first depth is included in a vehicle full-width range, and may determine the first length and the second depth as the length and depth of the first vehicle target 21. Herein, the vehicle full-length range and the vehicle full-width range may be preset as sizes that various vehicles may have and stored in the memory 142.

In addition, the processor 141 may determine a second object 22 as a second vehicle target 22 by calculating a second length between the fourth corner point CP4 and the fifth corner point CP5 of a second object 22 to determine that the second length is included in a vehicle full-range range, and by calculating a second depth between the fourth corner point CP4 and the sixth corner point CP6 of a second object 22 to determine that the second length is included in a vehicle full-width range, and may determine the first length and the second depth as the length and depth of the first vehicle target, and may determine that two vehicle targets 21, 22 are located with a parking space PA therebetween. Herein, the vehicle full-length range and the vehicle full-width range may be preset as sizes that various vehicles may have and stored in the memory 142.

In addition, the processor 141 may determine a third length between the second corner point CP2 of the first object 21 and the fourth corner point CP4 of the second object 22 as the length of a parking space PA, and may determine the depth between the second corner point CP2 and the third corner point CP3 of the first object 21 and the depth between the fourth corner point CP4 and the sixth corner point CP6 of the second object as the depth of a parking space PA.

In addition, the processor 141 may determine whether the objects 21, 22 are the vehicle targets 21, 22 that are parked in the parking lot based on the speed of the objects 21, 22. Specifically, the processor 141 may determine the objects 21, 22 as the vehicle targets 21, 22 that are parked in the parking lot when the speed of the objects 21, 22 is less than a reference speed (e.g., 0 km/h). That is, if the speed of the objects 21, 22 is greater than or equal to the reference speed, the processor 141 recognizes them as other parked vehicles or pedestrians and does not determine them as the vehicle targets 21, 22.

In addition, the processor 141 may determine whether the objects 21, 22 are vehicle targets 21, 22 that are parking in the parking lot based on the signal strengths of electromagnetic waves that are emitted by the 4D imaging radar, reflected by the objects 21, 22 and returned. Specifically, since the vehicle targets 21, 22 reflect electromagnetic waves better than other objects, the signal strength of electromagnetic waves that are reflected by the vehicle targets 21, 22 is relatively high. Therefore, if the signal strength of electromagnetic waves that are emitted by the 4D imaging radar 110, reflected by the objects 21, 22 and returned is greater than or equal to a reference strength, the processor 141 determines the objects 21, 22 as vehicle targets 21, 22 that are parked in the parking lot.

In addition, the processor 141 may calculate the angles of the vehicle targets 21, 22 with respect to the scan direction of the 4D imaging radar 110. For example, as illustrated in FIG. 3, the processor 141 may calculate the angle of a first line segment connecting the fourth corner point CP4 and the fifth corner point CP5 of the second object 22 with respect to the scan direction, and in this case, the angle of the first line segment with respect to the scan direction may be calculated as 0 degrees. In addition, as illustrated in FIG. 5, the processor 141 may calculate the angle of a second line segment connecting the fourth corner point CP4 and the fifth corner point CP5 of the second object 22 with respect to the scan direction, and in this case, the angle of the second line segment with respect to the scanning direction may be calculated as a reference angle (e.g., 45 degrees) or more.

As illustrated in FIG. 3, the processor 141 may determine the parking space PA as a parallel parking space, if the vehicle targets 21, 22 are parallel to the scan direction of the 4D imaging radar 110, the length of the vehicle targets 21, 22 is included in a vehicle full-length range, and the length of the parking space PA is greater than or equal to a maximum value of the vehicle full-length range.

In addition, as illustrated in FIG. 4, the processor 141 may determine the parking space PA as a perpendicular parking space, if the vehicle targets 21, 22 are parallel to the scan direction of the 4D imaging radar 110, the length of the target vehicles 21, 22 is included in a vehicle full-width range, and the length of the parking space PA is greater than or equal to a maximum value of the vehicle full-width range.

In addition, the processor 141 determines the parking space PA as an oblique parking space, if the angle of the vehicle targets 21, 22 is greater than or equal to a reference angle (e.g., 45 degrees), the length of the target vehicles 21, 22 is included in a vehicle full-width range, and the length of the parking space PA is greater than or equal to a maximum value of the vehicle full-width range.

As such, the apparatus for assisting parking 100 according to an exemplary embodiment of the present disclosure can minimize malfunction of the autonomous parking system and improve reliability by accurately detecting and classifying a parking space in a parking lot by using the 4D imaging radar 110.

Figure 6:
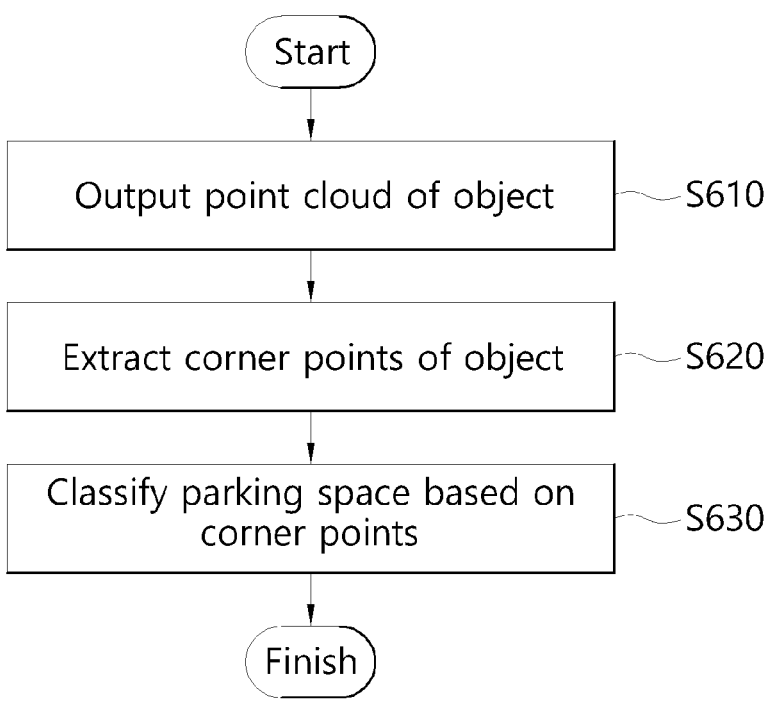
FIG. 6 is a schematic flowchart of the method for assisting parking according to an exemplary embodiment of the present disclosure.
Figure 7:
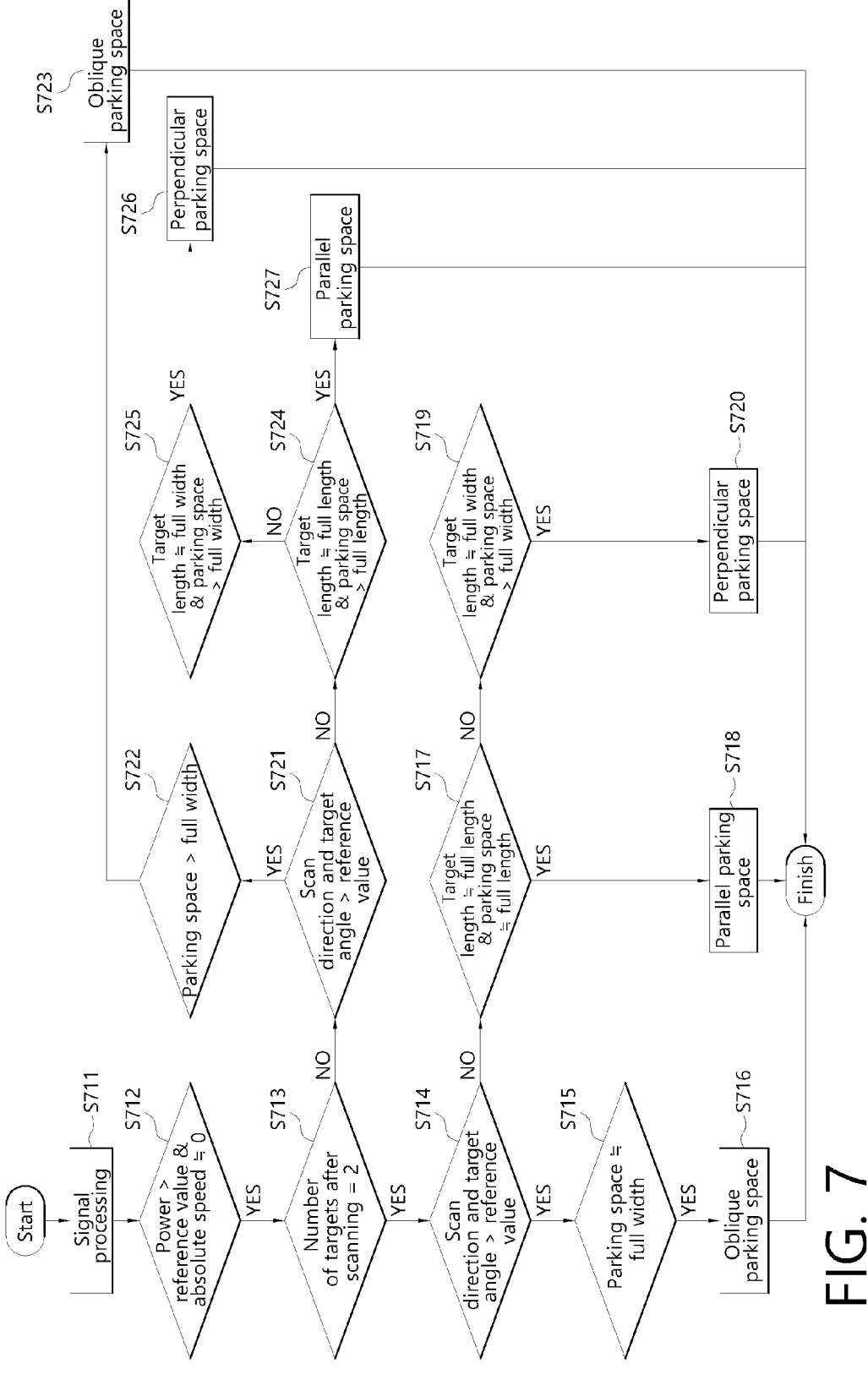
FIG. 7 is a detailed flowchart of the steps of classifying parking spaces in FIG. 6.

FIG. 6 is a schematic flowchart of the method for assisting parking according to an exemplary embodiment of the present disclosure, and FIG. 7 is a detailed flowchart of the steps of classifying parking spaces in FIG. 6.

Hereinafter, the method for assisting parking according to an exemplary embodiment of the present disclosure will be described with reference to FIGS. 6 and 7, but the same content as the above description will be omitted.

Referring to FIG. 6, the method for assisting parking according to an exemplary embodiment of the present disclosure is a method of classifying a parking space by using an electronic device to perform the autonomous parking of a host vehicle, and first of all, the 4D imaging radar 110 detects the distance, height, depth and speed of objects 21, 22 that are located in a parking lot and outputs as a point cloud S610.

Next, a plurality of corner points CP1 to CP6 of the objects 21, 22 are extracted by signal processing the point cloud S620.

Next, based on the plurality of corner points CP1 to CP6, it classifies a parking space PA that is available in the parking lot S630.

Referring to FIG. 7, in the step of classifying a parking space PA S630, first of all, the signals of electromagnetic waves that are reflected by the objects 21, 22 are processed S710 to calculate the length, height and depth of the objects 21, 22 based on distances between the plurality of corner points CP1 to CP6, and when the length, height and depth of the objects 21, 22 are included in reference ranges, it determines the objects 21, 22 as vehicle target 21, 22 that are parked in the parking lot. In this case, the reference ranges may be preset as sizes that various vehicles may have and stored in the memory 142.

Next, the signal strength of electromagnetic waves that are reflected from the objects 21, 22 is compared with a reference strength, and the speed of the object 21, 22 is compared with a reference speed (e.g., 0 km/h) S712.

Next, if the speed of the objects 21, 22 is less than the reference speed and the signal strength of electromagnetic waves that are reflected from the objects 21, 22 is greater than or equal to the reference strength, it determines the objects 21, 22 as vehicle targets 21, 22 that are parked in the parking lot.

In this case, it is possible to determine the parking space PA, and it is also possible to determine whether only one of the vehicle targets 21, 22 is located on one side of the parking space PA or two thereof are located on both sides of the parking space PA.

Next, when it is determined that there are two vehicle targets 21, 22, the angle of the vehicle targets 21, 22 with respect to the scan direction of the 4D image radar 110 is compared with a reference angle (e.g., 45 degrees) S714.

Next, if the angle of the vehicle targets 21, 22 is greater than or equal to a reference angle, the length of the parking space PA is compared with a vehicle full-width range S715.

Next, if the length of the parking space PA is greater than or equal to a maximum value of the vehicle full-width range, it determines the parking space PA as an oblique parking space S716.

Next, if the angle of the vehicle targets 21, 22 is less than the reference angle, it is determined that the vehicle targets 21, 22 are parallel to the scan direction of the 4D imaging radar 110, and the length of the target vehicles 21, 22 is compared with a vehicle full-length range, and the length of the parking space PA is compared with the vehicle full-length range S717.

Next, if the length of the target vehicles 21, 22 is included in the vehicle full-length range and the length of the parking space PA is greater than or equal to a maximum value of the vehicle full-length range or similar to the vehicle full-length range, it determines the parking space PA as a parallel parking space S718.

Next, if the length of the target vehicles 21, 22 is not included in the vehicle full-length range or the length of the parking space PA is less than a maximum value of the vehicle full-length range or not similar to the vehicle full-length range, the length of the target vehicles 21, 22 is compared with a vehicle full-width range, and the length of the parking space PA is compared with the vehicle full-width range S719.

Next, if the length of the target vehicles 21, 22 is included in the vehicle full-width range and the length of the parking space PA is greater than or equal to a maximum value of the vehicle full-width range or similar to the vehicle full-width range, it determines the parking space PA as a perpendicular parking space S720.

Next, if it is determined that there is only one vehicle target 21, the angle of the vehicle target 21 with respect to the scan direction of the 4D image radar 110 is compared with a reference angle (e.g., 45 degrees) S721.

Next, if the angle of the vehicle target 21 is greater than or equal the reference angle, the length of the parking space PA is compared with the vehicle full-width range S722.

Next, if the length of the parking space PA is greater than or equal to a maximum value of the vehicle full-width range, it determines the parking space PA as an oblique parking space S723.

Next, if the angle of the vehicle target 21 is less than the reference angle, it is determined that the vehicle target 21 is parallel to the scan direction of the 4D imaging radar 110, and the length of the target vehicle 21 is compared with the vehicle full-length range, and the length of the parking space PA is compared with the vehicle full-length range S724.

Next, if the length of the target vehicle 21 is included in the vehicle full-length range and the length of the parking space PA is greater than or equal to a maximum value of the vehicle full-length range, it determines the parking space PA as a parallel parking space S727.

Next, if the length of the target vehicle 21 is not included in the vehicle full-length range or the length of the parking space PA is less than a maximum value of the vehicle full-length range, the lengths of the target vehicles 21, 22 are compared with the vehicle full-width range, and the length of the parking space PA is compared with the vehicle full-width range S725.

Next, if the length of the target vehicle 21 is included in the vehicle full-width range and the length of the parking space PA is greater than or equal to a maximum value of the vehicle full-width range, it determines the parking space PA as a perpendicular parking space S726.

As such, the method for assisting parking according to an exemplary embodiment of the present disclosure can minimize malfunction of the autonomous parking system and improve reliability by accurately detecting and classifying a parking space in a parking lot by using the 4D imaging radar 110.

Although an exemplary embodiment of the present disclosure has been described above, the spirit of the present disclosure is not limited to the exemplary embodiments presented herein, and a person skilled in the art who understands the spirit of the present disclosure may easily suggest other exemplary embodiments by modifying, changing, deleting or adding elements within the scope of the same spirit, but this will also be said to fall within the scope of the present disclosure.

What is claimed is:

1. An apparatus for assisting parking for a host vehicle, comprising:

a radar configured to detect a plurality of points of an object and output information of the plurality of points as a point cloud, wherein the plurality of points are detected by receiving signals of electromagnetic waves that are reflected from the object; and a processor configured to calculate length, height, depth and speed of the object and extract a plurality of corner points of the object based on distances between the plurality of points included in the information output from the radar, wherein the processor is further configured to:

determine the object as a vehicle target when the speed of the object is less than a reference speed, a size of the object is within a preset size, and a signal strength of the electromagnetic waves reflected from the object is greater than a reference strength based on the information output from the radar, wherein the size of the object is calculated by the length, the height and the depth of the object;

determine an area around the object as a parking space based on the plurality of corner points of the object when the object is the vehicle target; and determine the parking space as a parallel parking space, a perpendicular parking space or an oblique parking space based on the length, the height and the depth of the object.

2. The apparatus of claim 1, wherein the processor is configured to determine whether the object is the vehicle target that is parked in a parking lot, and the number of vehicle targets based on the plurality of corner points.

3. The apparatus of claim 1, wherein the processor is configured to calculate an angle of the vehicle target with respect to the scan direction of the radar.

4. The apparatus of claim 3, wherein the processor is configured to:

determine the parking space as the parallel parking space, when the vehicle target is parallel to the scan direction of the radar, the length of the target vehicle is included in a vehicle full-length range, and the length of the parking space is greater than or equal to a maximum value of the vehicle full-length range;

determine the parking space as the perpendicular parking space, when the vehicle target is parallel to the scan direction of the radar, the length of the target vehicle is included in a vehicle full-width range, and the length of the parking space is greater than or equal to a maximum value of the vehicle full-width range; and determine the parking space as the oblique parking space, when the angle of the vehicle target is greater than or equal to a reference angle, the length of the target vehicle is included in a vehicle full-width range, and the length of the parking space is greater than or equal to a maximum value of the vehicle full-width range.

5. The apparatus of claim 1, wherein the processor is configured to classify the parking space, and then generate a parking path according to the parking space.

6. A method for assisting parking for a host vehicle, comprising the steps of:

detecting a plurality of points of an object located in a parking lot by a radar and outputting information of the plurality of points as a point cloud, wherein the plurality of points are detected by receiving signals of electromagnetic waves that are reflected from the object;

calculating, by a processor, length, height, depth and speed of the object and extracting a plurality of corner points of the object based on distances between the plurality of points included in the information output from the radar;

determining, by the processor, the object as a vehicle target when the speed of the object is less than a reference speed, a size of the object is within a preset size, and a signal strength of the electromagnetic waves reflected from the object is greater than a reference strength based on the information output from the radar, wherein the size of the object is calculated by the length, the height and the depth of the object;

determining, by the processor, an area around the object as a parking space that is available in the parking lot based on the plurality of corner points when the object is the vehicle target; and determining, by the processor, the parking space as a parallel parking space, a perpendicular parking space or an oblique parking space based on the length, the height and the depth of the object.

7. The method of claim 6, wherein the step of determining the parking space comprises the step of:

determining whether the object is the vehicle target that is parked in a parking lot and the number of vehicle targets based on the plurality of corner points.

8. The method of claim 7, wherein the step of determining the parking space further comprises the steps of:

calculating an angle of the vehicle target with respect to the scan direction of the radar.

9. The method of claim 8, wherein the step of determining the parking space comprises the step of:

determining the parking space as the parallel parking space, when the vehicle target is parallel to the scan direction of the radar, the length of the target vehicle is included in a vehicle full-length range, and the length of the parking space is greater than or equal to a maximum value of the vehicle full-length range;

determining the parking space as the perpendicular parking space, when the vehicle target is parallel to the scan direction of the radar, the length of the target vehicle is included in a vehicle full-width range, and the length of the parking space is greater than or equal to a maximum value of the vehicle full-width range; and determining the parking space as the oblique parking space, when the angle of the vehicle target is greater than or equal to a reference angle, the length of the target vehicle is included in a vehicle full-width range, and the length of the parking space is greater than or equal to a maximum value of the vehicle full-width range.

* * * * *